J. L. DONALY.
FISHING BAIT.
APPLICATION FILED DEC. 22, 1913.
1,243,391.
Patented Oct. 16, 1917.
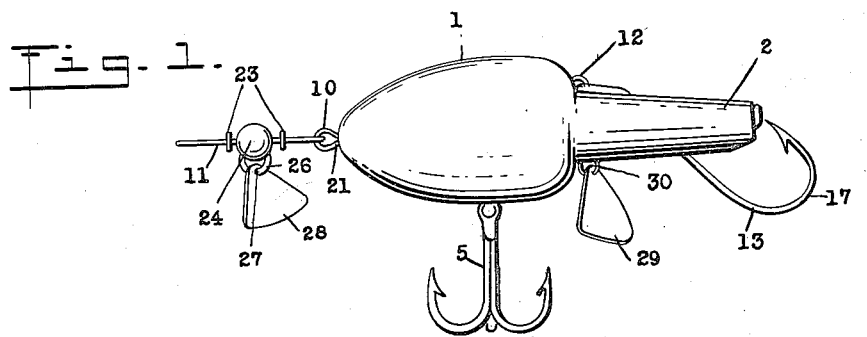
Fig. 1.
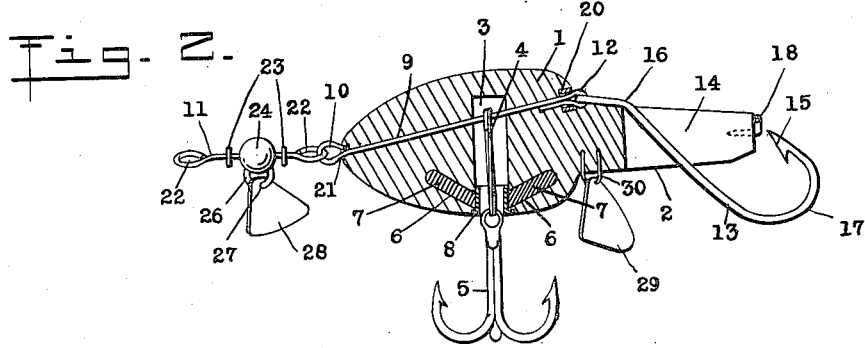
Fig. 2.
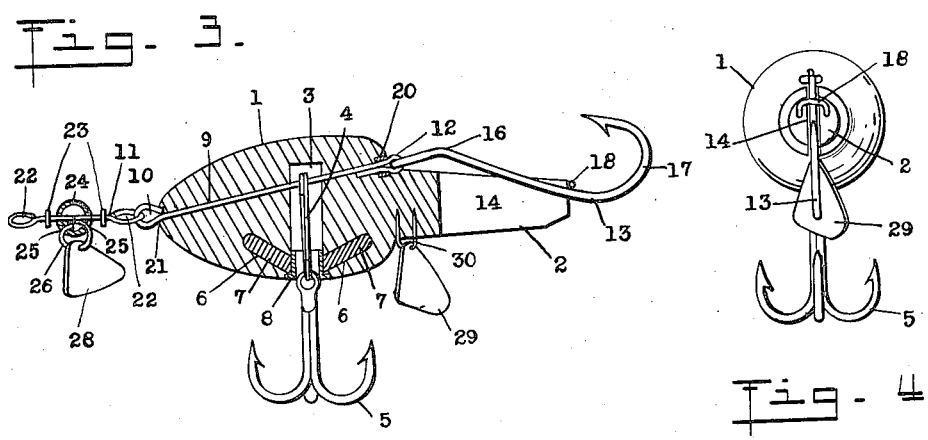
Fig. 3.
Fig. 4.
WITNESSES:
Howard P. King.
Mildred E. Brooks.
INVENTOR:
James L. Donaly,
BY Russell M. Everett,
ATTORNEY.

UNITED STATES PATENT OFFICE.

JAMES L. DONALY, OF NEWARK, NEW JERSEY.

FISHING-BAIT.

1,243,391.　　　　Specification of Letters Patent.　　Patented Oct. 16, 1917.

Application filed December 22, 1913. Serial No. 808,188.

*To all whom it may concern:*

Be it known that I, JAMES L. DONALY, a citizen of the United States, residing at Newark, in the county of Essex and State of New Jersey, have invented certain Improvements in Fishing-Baits, of which the following is a specification.

The objects of this invention are to provide an improved construction and novel arrangement of parts in a bait or lure; to pivot a terminal hook intermediate of the ends of the body portion of the bait; to restrict the movement of said terminal hook, and more particularly to restrict such movement to a limited amplitude of swing in a substantially vertical plane; to normally guard or protect the point of a terminal hook so as to prevent said hook from entanglement in weeds or the like as the bait is trolled; to provide weight pockets in the side wall of the spring-link socket, and enable the ferrule for said socket to close the said weight pockets; to secure a simple and durable construction, and to obtain other advantages and results as may be brought out in the following description.

Referring to the accompanying drawings, in which like numerals of reference indicate the same parts throughout the several views, Figure 1 is a side elevation of my improved fishing bait;

Fig. 2 is a vertical longitudinal section of the same, with the hook in normal position;

Fig. 3 is a similar sectional view showing the hook in the position it assumes when the bait is seized by a fish, and Fig. 4 is an end view of the bait as viewed from the right-hand end of Fig. 1.

In the specific embodiment of the invention illustrated in said drawings, the reference numeral 1 indicates the body of my improved bait integrally formed with a tail 2, the whole being preferably a solid of revolution composed of wood or the like, with the diameter of the body 1 preferably greater than the diameter of the tail 2. A socket 3 extends transversely and diametrically into the body 1 from one side thereof intermediate of its ends, to receive a spring link 4 as hereinafter described, a hook 5 being secured to said spring link as desired. Adjacent the mouth of said recess 3 lateral pockets 6, 6 are sunk in the side wall of said socket 3, said pockets extending into the body 1 of the bait, preferably at an incline, and being adapted to contain weights 7, 7 as of lead or the like, whereby the bait will be held in a given position or upright when placed in the water. A ferrule 8 inserted in the mouth of the socket 3 serves to also close the mouths of the pockets 6, 6 and prevent any possible escape of the weights 7, 7 therefrom.

A wire 9 extends from the front end of the body 1 lengthwise of the bait through or across the inner end portion of the socket 3 and is inclined oblique to the axis of the bait sufficiently to emerge from the body 1 at the upper side of the junction of the tail 2 with the body 1, or side which is uppermost when the bait floats in the water in a position determined by the weights 7. This wire 9 extends through the eye at the inner end of the spring link 4, and at its forward end is provided with a loop 10 to receive a link 11 hereinafter described and which is adapted to receive a fish line (not shown). The other or rear end of said wire 9 is also provided with a loop 12 which engages the eye of a terminal hook 13, the peculiar relation of which to the rest of the bait constitutes a feature of my invention.

The tail 2 of the bait is slotted vertically as at 14, said slot extending from the end of the tail to a point thereof at a short distance from the body 1, and being of sufficient width for the hook 13 to swing freely therein without undue lateral motion, thus forming a guideway for said hook, as illustrated in Fig. 4, although I do not limit myself to the exact proportions shown in said figure. The rear loop 12 of the wire 9 preferably stands vertically edgewise, so that the eye of the hook 13 lies horizontally upon the top of the tail 2, together with the adjacent portion of the shank of the hook. At a distance from said eye substantially equal to the distance of the front end of the slot therefrom, the shank of the hook 13 is bent so as to extend obliquely downward through the slot 14, the angle of bending being such that the barbed point 15 of the hook will lie adjacent to and behind the end of the tail 2, which forms a guard for the point, as clearly shown in Figs. 1, 2 and 4. The bend 16 in the hook, it will be understood, is transverse to the plane of the eye and in a direction from said plane opposite that in which the barbed point 15 projects. It will be further understood that the angle of this bend may vary under different conditions and that I do not intend to limit myself to any particular angle.

With the hook in normal position as shown in Figs. 1, 2 and 4, it is obvious that it will not catch upon floating weeds and the like as the bait is drawn through the water in trolling or otherwise using it, and thus a great deal of inconvenience and annoyance to the fisherman is avoided. At the same time, if a fish grasps the rear end of the bait in his mouth the pressure of his under jaw, upon the bowed portion 17 of the hook and the pressure of his upper jaw upon the tail 2 of the bait will swing the hook upward so that the barbed point 15 will be exposed, as shown in Fig. 3, to catch the fish, and this action takes place automatically upon the bait being seized by the fish. Preferably, a staple 18 or any other equivalent stop is provided upon the tail 2 to extend across the slot 14 and limit upward swinging of the hook 13, at least so that said hook shall not swing clear out of the slot 14. I have shown a staple 18 driven into the extremity of the tail 2, one leg into each half thereof and the rounded closed end of the staple bent upward against the said extremity of the tail, so as to form an inverted U-shaped stop 19, but I do not limit myself to this.

Where the rear end of the wire 9 emerges from the body 1 of the bait, a bushing 20 is preferably inserted in said body, around the said wire, so that neither the loop 12 nor the eye of the hook 13 can wear the body 1 and thus permit lost motion of the hook such as would interfere with the automatic operation of the hook as I have described. It will be understood that the wire 9 fits tight in the body 1, both laterally and longitudinally, so that neither is there any passage around the wire nor does it move with respect to the body. In fact, the extremity 21 of the forward end of the wire after forming the loop 10 is extended into the body 1 so as to key the wire against turning.

The link 11 at the front end of the bait is formed of a short piece of wire bent at each end into an eye 22, and carrying washers 23, 23 adjacent said eyes. The middle part of the link is a straight single strand of wire and upon it is threaded or strung a hollow ball 24 having diametrically opposite apertures to receive the wire, and having at one side of the line of said apertures, in a plane therethrough, two other holes 25, 25 to receive the ends of a split ring 26 which also passes through the eye 27 of a flat triangular blade 28. The ends of the split ring after being inserted in the holes 25, 25 of the hollow ball 24 are forced toward and past each other, so that they overlap as shown in Fig. 3. As a result of this, the split ring cannot escape from the hollow ball, because as soon as it begins to turn so as to withdraw one end the other end abuts against the inside of the ball adjacent to the aperture through which the ring is slipping outward, as will be obvious.

Preferably a rear blade 29, similar to the front one 28 is mounted at the lower or under side of the tail 2, adjacent to the body 1, by means of a staple 30, whose bowed projecting end stands substantially in the vertical longitudinal plane of the bait. This blade, by its oscillation, creates a disturbance in the water which obscures the hook 13 in its normal lowered position.

The body and tail of my improved bait are buoyant enough to float the bait, and thus in the water since, the weights 7 cause the bait to stand upright, the body portion and tail will move upward and the hook 13 swing downward automatically and by gravity into its normal position so that it will not engage weeds and the like.

While I have shown a hook in a guideway or slot formed by a saw-slit in the wooden tail 2 of my bait, it will be understood that the guideway can be formed in other kinds of body portions and in other ways, by those skilled in the art, and still perform the functions of my invention in allowing movement of the hook in a substantially longitudinal plane of the bait while restricting movement in other directions. I therefore do not wish to be understood as limiting myself herein except as required by the following claims when construed in the light of the prior art.

Having thus described the invention, what I claim is—

1. In a fishing bait, the combination with a body portion having a longitudinal slot forming a transverse guideway, of a hook pivoted to lie by gravity in said slot or guideway with its point protected and its rounded or curved part exposed.

2. In a fishing bait, the combination with a body portion having a longitudinal slot forming a transverse guideway, of a hook pivoted to lie by gravity in said slot or guideway with its rounded or curved part exposed and its point behind the body portion and adjacent thereto.

3. In a fishing bait, the combination with a body portion having a longitudinal slot forming a transverse guideway, of a hook pivoted to the outside of said body portion at a distance from the end of said slot or guideway and adapted to lie by gravity in said slot or guideway with its point protected and its rounded or curved part exposed.

4. In a fishing bait, the combination with a body portion having a longitudinal slot forming a transverse guideway, of a hook pivoted to the outside of said body portion at a distance from the end of said slot or guideway and adapted to lie by gravity in said slot or guideway with its shank extending through said slot or guideway, its rounded or curved part exposed at the opposite side of the body portion and its point behind the body portion and adjacent thereto.

5. In a fishing bait, the combination with a body portion having a longitudinal slot forming a transverse guideway and opening through one end of said body portion, of a hook pivoted to lie by gravity in said slot or guideway with its point protected and its rounded or curved part exposed, and a stop on the outside of the end of the body portion extending across said slot or guideway to prevent the hook swinging out of the slot.

6. In a fishing bait, a body portion having a socket bored therein and pockets sunk in the side wall of said socket, and weights in said pockets.

7. In a fishing bait, a body portion having a socket bored therein and pockets sunk in the side wall of said socket, weights in said pockets, and a ferrule for the mouth of said sockets closing said pockets.

8. In a fishing bait, the combination with a body portion having at one end a longitudinal slot forming a transverse guideway, of a wire extending from the other end of the bait through the same and emerging therefrom at a point a little distant from the closed end of said slot or guideway, and a hook pivoted to said wire and bent to normally extend through said slot or guideway with its point protected and its rounded or curved part exposed.

9. In a fishing bait, a piece of wire, spaced stops on said wire, a hollow ball on said wire between said stops, said ball apertured to receive the wire and having other apertures, a split ring with its ends extending through said other apertures and overlapping each other within the ball, and a blade carried by said split ring.

10. In a fishing bait, the combination of a body portion providing a guideway, and a hook pivoted to said body portion to swing in said guideway and normally lie by gravity with its point protected.

11. In a fishing bait, the combination with a body portion providing a transverse guideway, of a hook pivoted to lie by gravity in said guideway with its point protected and its rounded or curved part exposed.

12. In a fishing bait, the combination of a body, means providing a guideway, and a hook pivoted to lie by gravity in said guideway with its point protected.

JAMES L. DONALY.

Witnesses:
  MILDRED E. BROOKS,
  JANET A. AYERS.